United States Patent [19]
Naudin et al.

[11] Patent Number: 5,168,775
[45] Date of Patent: Dec. 8, 1992

[54] DAMPED DOUBLE FLYWHEEL, IN PARTICULAR FOR A MOTOR VEHICLE

[75] Inventors: Jacky Naudin, Metz-Vallieres; Jacques Michon, Paris, both of France

[73] Assignee: Valeo, Paris, France

[21] Appl. No.: 715,642

[22] Filed: Jun. 14, 1991

[30] Foreign Application Priority Data

Jun. 15, 1990 [FR] France .................. 90 07528

[51] Int. Cl.$^5$ .................. F16D 3/80; F16F 15/10
[52] U.S. Cl. .................. 74/574; 464/24; 464/67; 464/68; 192/106.2
[58] Field of Search .............. 74/572, 574; 464/61, 464/62, 66, 67, 68, 24; 192/106.1, 106.2

[56] References Cited
U.S. PATENT DOCUMENTS

| | | | |
|---|---|---|---|
| 4,351,167 | 9/1982 | Hanke et al. | 464/24 |
| 4,714,449 | 12/1987 | Woerner et al. | 464/68 |
| 4,739,866 | 4/1988 | Reik et al. | 192/70.17 X |
| 4,782,936 | 11/1988 | Bopp | 192/106.2 |
| 4,903,544 | 2/1990 | Naudin | 74/574 |
| 4,905,539 | 3/1990 | Naudin et al. | 74/574 |
| 5,030,166 | 7/1991 | Wörner et al. | 464/24 |

FOREIGN PATENT DOCUMENTS

| | | |
|---|---|---|
| 3624498 | 1/1988 | Fed. Rep. of Germany . |
| 3704643 | 8/1988 | Fed. Rep. of Germany . |
| 2609132 | 7/1988 | France . |
| 2618199 | 1/1989 | France . |
| 2626337 | 7/1989 | France . |

Primary Examiner—Richard Lorence
Assistant Examiner—William O. Trousdell
Attorney, Agent, or Firm—Longacre & White

[57] ABSTRACT

A damped double flywheel, in particular for a motor vehicle, comprises two coaxial inertia masses which are mounted for rotation with respect to each other against the action of springs and a viscous damper. The viscous damper comprises a sealed cavity bounded by two cover plates which are joined together through a spacer element. The viscous damper also includes first teeth directed radially inwards and alternating with second teeth which are directed radially outwardly.

At least one of the cover members is provided with a recess in the face of the cover member which cooperates with the said second teeth, with the recess facing the latter and being so positioned as to lie against the corresponding tooth during normal operation, but not when the engine is being started or stopped, so that the viscous damper can operate to full effect under these latter conditions.

4 Claims, 1 Drawing Sheet

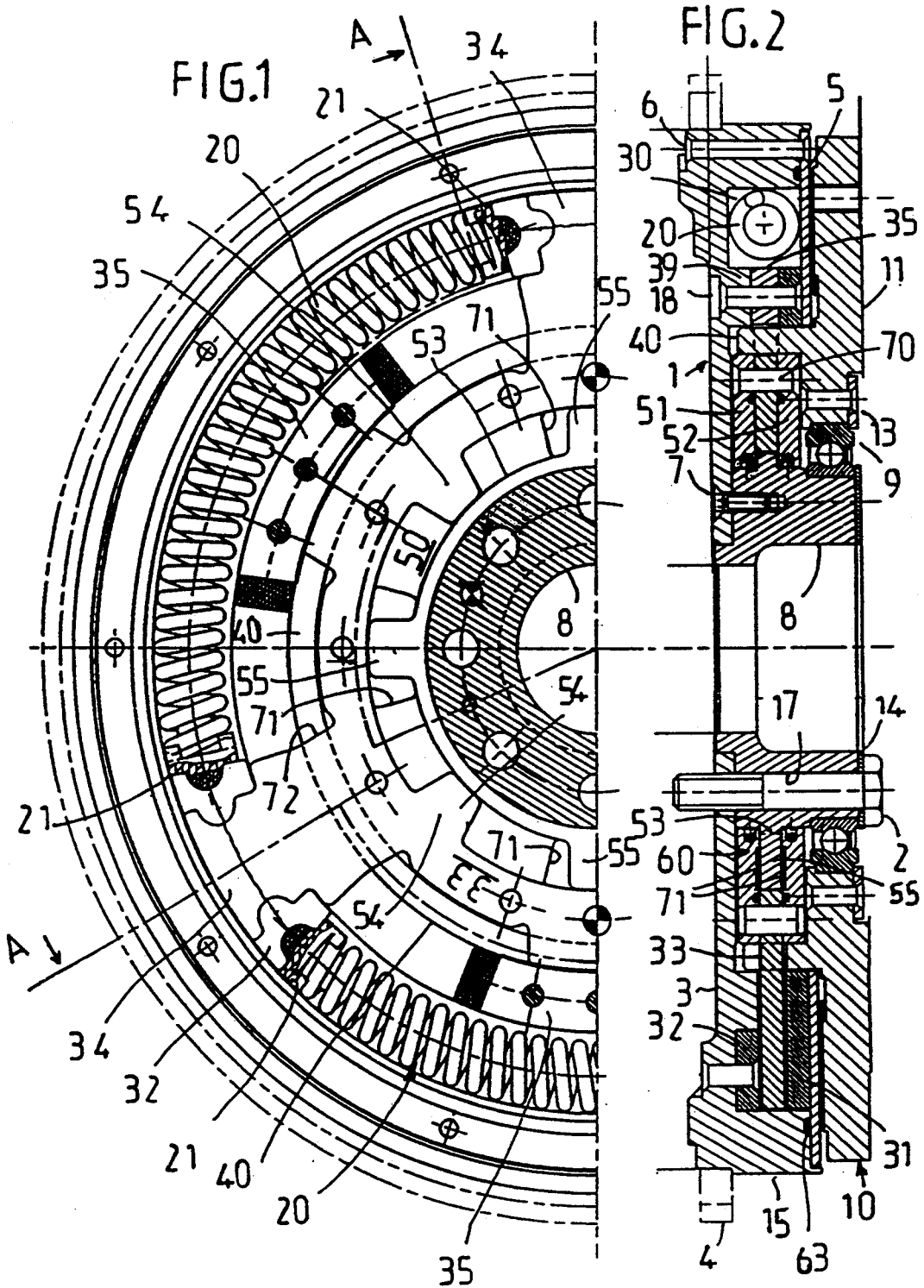

DAMPED DOUBLE FLYWHEEL, IN PARTICULAR FOR A MOTOR VEHICLE

FIELD OF THE INVENTION

This invention relates to a damped double flywheel, in particular for a motor vehicle, of the kind comprising two coaxial inertia masses which are mounted for relative rotation of one with respect to the other, against the action of circumferentially acting resilient means and against the action of a viscous damping means.

BACKGROUND OF THE INVENTION

A double flywheel of the above kind is disclosed in the specification of U.S. Pat. No. 4,903,544 and the corresponding French published patent application No. FR 2 626 336A, in which the viscous damping means is arranged radially outwards of the resilient means, being mechanically interposed between the two inertia masses. The viscous damping means comprises a sealed cavity which is filled with a fluid, and is carried axially on a first one of the two inertia masses. The viscous damping means is dimensioned according to the application to which the flywheel is to be put, for the purpose of giving a predetermined degree of damping. It includes two closure members or covers, which are secured together by means of a spacer element in order to define the said cavity.

The cover members are fixed with respect to a damper plate, optionally with a clearance, at least to the extent that they rotate with the damper plate. The damper plate is arranged to come into engagement with the resilient means, which are operatively interposed between the two inertia masses. The damper plate may constitute the spacer means defining the cavity of the viscous damping means, or it may be separate from that cavity. In addition, the viscous damping means includes an outer carrier element which is provided with teeth directed radially inwardly (i.e. towards the axis of the assembly), and an inner carrier element having further teeth which are directed radially outwardly (i.e. away from the axis of the assembly). The teeth of the outer carrier element are arranged to alternate with those of the inner carrier element.

In that type of arrangement, a problem arises from the fact that the viscous damping means is arranged to be effective to apply damping forces over large relative angular displacements between the two inertia masses, especially on stopping and starting of the engine when the resonant frequency is passed. This viscous damper can however produce perturbations during normal operation, especially due to shear forces in the fluid between the teeth and the cover members.

In order to overcome this drawback, it might be conceived that the viscous damping means could be locked, for example with the aid of locking members which are responsive to the displacement between the two inertia masses. However, such an arrangement would call for considerable modification of the viscous damper.

DISCUSSION OF THE INVENTION

An object of the present invention is to overcome these drawbacks, and to provide, in a simple and economic manner, a novel double flywheel having a viscous damping means such as to minimise to the greatest possible extent any perturbation in the operation of the double flywheel during normal operation.

According to the invention, there is provided a damped double flywheel comprising two coaxial inertia masses mounted for relative rotation of one with respect to the other against the action of circumferentially acting resilient means, and against the action of a viscous damping means comprising a sealed cavity, which is at least partially filled with a viscous fluid and which is bounded by two cover members joined together by means of a spacer element, wherein the viscous damping means has first teeth which are directed radially towards the axis of the assembly, being associated with an outer carrier element, together with second teeth alternating with the said first teeth, the said second teeth being directed radially away from the axis of the assembly and being associated with an inner carrier element, characterised in that at least one of the said cover members has a recess at the radial level of the said second teeth of the inner carrier element, on either side of the said second teeth and facing the latter.

With this arrangement according to the invention, in normal operation of the vehicle, the teeth of the inner carrier element are displaced in line with the recesses of the cover member in such a way that shear forces in the viscous damping fluid are minimised. By contrast, when a large relative angular displacement takes place between the two inertia masses, the corresponding teeth are thereby brought into facing relationship with the unrecessed parts of the cover members, so that the viscous damper is then able to operate to full effect. Thus in normal operation, the lateral passages between the teeth of the inner carrier element and the cover member or members are larger than those that exist during large angular displacements.

The invention enables the viscous drag to be reduced, without disturbing operation by transfer between variable volume chambers of the viscous damping means when large relative angular displacements are taking place. The simplicity of this solution will be appreciated. It involves modifying only the cover member or members, which are components that are easy to machine.

A preferred embodiment of the invention will now be described, by way of example only and with reference to the accompanying drawings.

BRIEF DESCRIPTION OF THE DRAWINGS

FIG. 1 is a half view, as seen from the front and partly in cross section, of the double flywheel, showing the interior of/the flywheel with the cover plate removed.

FIG. 2 is a view in cross section taken on the line A—A in FIG. 1.

DESCRIPTION OF A PREFERRED EMBODIMENT OF THE INVENTION

The damped double flywheel for a motor vehicle which is shown in the drawings comprises two coaxial inertia masses 1 and 10 which are mounted for relative rotation of one with respect to the other against the action of circumferentially acting resilient means 20 and against the action of a viscous damping means 60.

The first inertia mass 1 comprises a housing 3, which is closed by a cover plate 5 and a central hub 8. The hub 8 is fastened to the nose of the crankshaft (not shown) of the internal combustion engine of the motor vehicle, by means of a plurality of studs 2 which extend through holes 17 formed in the hub 8 and the housing 3. The housing 3 is secured to the hub 8 by means of its base, using screws 7. It has an axially orientated external peripheral flange 15 carrying the starter crown 4. The housing 3 is hollow, and in this example it is annular, as is the cover plate 5, which is secured to the housing flange 15 by means of rivets 6.

Guide rings 31 and 32 are sealingly fastened by being riveted to the inertia mass 1, with which they are therefore rotatable. In this example the guide rings 31 and 32 are in the form of a plurality of blocks. The blocks 32 are secured to the base of the housing 3 by means of rivets, while the blocks 31 are secured to an internal ring which is itself fastened by means of rivets 18 to the base of the housing 3, with a plurality of spacer elements 35 being interposed.

A damper plate 33 is coupled in rotation to the second inertia mass 10, optionally with a clearance, and is disposed axially between the two guide rings 31 and 32. The damper plate 33 has radial arms 34, which are arranged to intercept and to engage with a series of circumferentially acting resilient means 20, which in this example consist of a plurality of coil springs and which are operatively interposed between the two inertia masses 1 and 10, being located close to the housing flange 15. The damper plate 33 is mechanically coupled between the springs 20 and the viscous damping means 60.

The springs 20 extend on a pitch circle coaxial with the two inertia masses, and each spring 20 is of substantial length. Each spring 20 is mounted between two consecutive guide blocks 32 and two consecutive guide blocks 31, without any clearance, by means of pivoting insert or seating members 21. In this connection, it should be noted that the guide blocks 31 are arranged axially in line with the corresponding guide blocks 32. Each spring 20 is mounted between two consecutive ones of the radial arms 34 of the damper plate 33, by means of the insert members 21. The latter are arranged to intercept the radial arms 34 directly; and in the relaxed position of the assembly, there is a circumferential clearance between the arms 34 and the insert members 21. However, it should be noted that this clearance is optional. In the present example, there are three springs 20.

The second inertia mass 10 comprises an annular plate 11 which is the reaction plate of a clutch. The clutch has a friction disc (not shown) which is arranged to engage in contact with the reaction plate 11. This friction disc is secured to the input shaft (not shown) of the gearbox of the vehicle, for rotation with the input shaft. The inertia mass 10 is thus an output mass of the double flywheel.

A bearing 9 is interposed radially between the reaction plate 11 and the hub 8. This bearing may comprise an ant-friction bearing, or a rolling bearing as in FIGS. 1 and 2. The rolling bearing 9 is located axially on the hub 8 by means of a shoulder formed on the latter, together with an end ring 14 which also serves as a backing plate for the studs 2. The rolling bearing 9 is located axially on the reaction plate 11, by means of a shoulder of the latter and a locating ring 13 which is secured by riveting to the reaction plate 11 on the side of the latter opposite to the viscous damping means 60.

The springs 20 are arranged inside a first cavity 30, which is bounded mainly by the first inertia mass 1, and in particular by its housing 3 and cover plate 5. On its radially inward side, the cavity 30 is bounded by an axially extending annular wall 39 which is integral with the housing 3, by the spacer elements 35, and by the ring which comprises the guide blocks 31. Finally, the cavity 30 is defined by the damper plate 33, the radial arms 34 of which extend into the cavity 30 and enclose the spacer elements 35. Each spacer element 35 has a resilient pad at each of its circumferential ends, for cooperating with the appropriate radial arm 34 so as to reduce noise.

The damper plate 33 has a series of radial lugs 73, FIG. 1, for cooperation with the inner periphery of the respective spacer elements 35. In this example the cavity 30 is partly filled with a lubricating fluid for the springs 20, for example in the form of a grease.

The viscous damping means 60, mechanically interposed between the inertia mass 1 and the damper plate 33, defines a second sealed cavity 50, which is at least partially filled with a viscous second fluid that is different from the first fluid in the cavity 30. The cavity 50 is defined between the two inertia masses 1 and 10, and lies radially within the springs 20. Appropriate seals, indicated in FIG. 2 in faint lines (with one of them being indicated by the reference numeral 63) are of course provided in order to seal the cavities 30 and 50.

The viscous damping means 60 defines a viscous enclosure, which, together with the viscous fluid in it, forms a viscous body carried by the damper plate 33, being disposed axially between the base of the housing 3 and the reaction plate 11. In the axial direction, the second cavity 50 is bounded by two cover plates or annular closure members in the form of discs 51 and 52. The cover discs 51 and 52 are retained at an axial spacing from each other by means of an annular peripheral spacer element. In this example it is the damper plate 33 that constitutes this spacer element and which delimits the cavity 50 on its outer radial side. The cover discs 51 and 52 are joined together by means of rivets 70 passing through the damper plate 33, with seals being provided in the vicinity of the rivets 70 (see FIG. 2).

In a modification, each of the cover plates 51, 52 is secured to the damper plate 33 by means of at least one ring weld, in such a way that the radial size of the viscous damping means is reduced without any reduction in the size of the useful part of the viscous damper and therefore of its performance. The weld is preferably made using a laser welding process.

On its radially inward side, the second cavity 50 is bounded by the hub 8, which carries a radially projecting flange 53 that is interposed axially between the two cover discs 51 and 52, as is the damper plate 33. In this example, the flange 53 is integral with the hub 8, which constitutes an internal carrying element. The flange 53 is provided with radial teeth 55 which extend into the cavity 50 in a direction away from the axis of the assembly. It is by means of the flange 53 that the viscous damping means 60 is located axially on the first inertia mass 1.

The annular damper plate 33 constitutes an outer carrying element, having teeth 54 on its inner periphery, the teeth 54 being directed radially inwardly in the opposite direction from the teeth 55. The teeth 54 (or first teeth), directed towards the axis of the assembly, alternate in the circumferential direction with the teeth 55 (or second teeth), so as to define calibrated passages between the teeth 54 and 55 and between the cover discs 51 and 52.

The teeth 54 and 55 thus define chambers the volume of which is variable in operation. The high viscosity fluid with which the cavity 50 is filled (in this example partially) may for example be a silicone.

At least one of the cover members 51 and 52 is recessed at the radial level of the teeth 55 of the internal carrying element comprising the hub 8, on either side of the teeth 55 and facing the latter, by means of recesses seen at 71 in FIG. 2. Thus, the face of the cover member 51 or 52, or the face of each of these that is directed towards the interior of the second cavity 50 (and which is thus adjacent to the flange 53 and the teeth 55), is locally recessed. There is no recess at the radial level of the teeth 54.

As can be seen in FIG. 2, in this example both of the cover discs 51 and 52 are provided with recesses 71, and the latter extend symmetrically on either side of the teeth 55 when the damped double flywheel is in its relaxed condition. This arrangement is of course not mandatory. The corresponding recesses 71 of the cover discs 51 and 52 extend facing each other, with the cover discs being identical to each other. However, it is of course possible to offset the recesses 71 of one of the cover discs circumferentially with respect to those of the other.

The recesses 71 extend over the whole radial height of the teeth 55. They do not extend into the disc-like main portion of the flange 53 from which the teeth 55 project radially. The recesses 71 are generally rectangular in shape.

As will be understood, the viscous damping means is arranged to exert its damping forces when the engine is in a low regime, in particular on starting and stopping of the engine when passing through the resonant frequency below the slow running mode of the engine. During this operation, the viscous damping liquid is transferred from one of the variable volume chambers mentioned above to another, these chambers being delimited by a tooth 55, a successive tooth 54, and the internal carrying element 53 and external carrying element 33. When the two inertia masses 1 and 10 are displaced circumferentially from each other by a large amount, and particularly on starting and stopping of the vehicle, the teeth 55 become displaced circumferentially beyond the recesses 71, so that the viscous damping means is able to be fully effective. The circumferential length of the recesses 71 is of course selected according to the particular application to which the flywheel is to be put, and having regard to the angular displacement required between the teeth 54 and 55. By contrast, in normal operation (i.e. while the vehicle is running), the teeth 55 are disposed in line with the recesses 71, so that the lateral passages between the teeth 55 and the cover discs 51 and 52 become enlarged, so that shear forces in the viscous fluid between the cover discs 51 and 52 are reduced.

It will be noted that the damper plate 33 is coupled to the reaction plate 11 for rotation therewith, optionally after a clearance has been taken up. This coupling is achieved by means of tenons 40, which are fixed to the reaction plate 11 and which extend into notches 72 formed in the outer periphery of the damper plate 33. This coupling is therefore of the tenon and mortice type, with the notches 72 being defined by the radial arms 34 and by the lugs 73 of the damper plate 33. The tenons 40 extend radially between the first cavity 30 and the second cavity 50, and serve for centering the viscous damper by cooperation with the outer periphery of the cover discs 51 and 52 and the base of the notches 72. The tenons 40 are arcuate in shape.

The second inertia mass 10 is located axially on the first inertia mass 1 through the bearing 9 as described above. The cover disc 52, like the cover disc 51, has a groove at its inner periphery for accommodating seals which cooperate with the outer periphery of the hub 8 on either side of the flange 53.

During the relative rotational movement between the inertia masses 1 and 10, the motion is transmitted through the guide rings 31 and 32, the springs 20, and the damper plate 33, through the viscous damping means 60. On starting of the vehicle, the viscous damping means 60 does of course operate alone: the springs 20 are not compressed until after the clearance between the radial arms 34 and the springs 20 has been taken up. When there is a large relative angular displacement between the two inertia masses 1 and 10, the forces that can be exerted by the viscous damping means are fully realised by transfer of the viscous fluid between the variable volume chambers in the manner described above; while in normal running, the fluid shear forces, and thus the drag exerted by the viscous damper, are reduced due to the presence of the recesses 71, again as described above. It will of course be realised from the foregoing description that the depth of the recesses 71 will be chosen depending on the particular application to which the double flywheel is to be put.

The present invention is of course not limited to the embodiments described above. In particular, the first inertia mass 1 may be arranged as an output mass and the second inertia mass 10 as an input mass. The damper plate 33 may be fixed with respect to one of the cover members (e.g. 51, 52), with a spacer being then provided between the two cover members 51 and 52.

It is not mandatory to provide the first cavity 30 as such, or as a sealed cavity, as the springs 20 may not need to be lubricated, and may, instead of consisting of coil springs, be in the form of blocks of resilient material. The springs 20 may be arranged in two series arranged on different coaxial pitch circles of different diameters. In particular, and as disclosed more fully in the specification of French published patent application No. FR 2 618 199A, the guide rings may be in the form of radial plates which are so shaped as to engage with the outside of the springs 20, enveloping the latter, with one of these plates being extended up to the housing flange 15 so as to be secured on the latter.

The recesses 71 may of course be partly formed in the main portion of the flange 53, which may itself be a separate component from the hub 8, to which it is then secured, for example by welding. Similarly, the teeth 54 may be separate components from the damper plate 53, being then secured to the latter.

In another modification, if one of the cover members 51, 52 is recessed, the other one may not be recessed, and the outer carrying element may be recessed facing the teeth 55 in order to reduce still further the forces exerted by the viscous damping means 60 during normal operation.

Finally, each recess 71 may extend over a radial height which is less than that of the teeth 55; it may even extend to the level of the main part of the flange 53. The choice of these variations depends on the application to which the flywheel is required to be put.

What is claimed is:

1. A damped double flywheel comprising two inertia masses means mounting the two inertia masses coaxially for relative rotation of one with respect to the other, circumferentially acting resilient means disposed between the two inertia masses, and a viscous damping means disposed between the two inertia masses, whereby said relative rotational movement can take place against the action of said resilient means and against that of the viscous damping means, the viscous damping means comprising two cover members and a spacer element joining the two cover members together to define between the cover members a sealed cavity for containing a viscous fluid, the viscous damping means further comprising an outer carrier element, having a plurality of first teeth extending radially inwardly, and an inner carrier element having second teeth directed radially outwardly and alternating with said first teeth, wherein at least one of said cover members has a recess confronting an axial facing side of said second teeth for cooperation with the latter.

2. A double flywheel according to claim 1, wherein said recess of at least one said cover member extends over the full radial height of said second teeth.

3. A double flywheel according to claim 2, wherein the shape of each said recess is generally rectangular.

4. A double flywheel according to claim 2, wherein said inner carrier element has a flange comprising a main part, said second teeth being part of said flange and extending radially outwardly from said main part, with both of said cover members being provided with said recesses which extend radially beyond the main part of the flange.

* * * * *